United States Patent [19]
Dutton et al.

[11] Patent Number: 5,754,190
[45] Date of Patent: May 19, 1998

[54] SYSTEM FOR REPRODUCING IMAGES UTILIZING IMAGE LIBRARIES

[75] Inventors: Drew J. Dutton; Douglas D. Gephardt, both of Austin; Steven L. Belt, Pflugerville; Brett B. Stewart; Rita M. Wisor, both of Austin, all of Tex.

[73] Assignee: Advanced Micro Devices, Sunnyvale, Calif.

[21] Appl. No.: 481,630

[22] Filed: Jun. 7, 1995

[51] Int. Cl.$^6$ ................................................. G06T 13/00
[52] U.S. Cl. ........................... 345/473; 345/475; 345/329
[58] Field of Search ........................... 395/135, 152, 395/153, 154, 806, 807, 173, 174, 175, 327, 329, 330, 331, 15; 348/408, 409, 412, 413, 415; 382/232, 236

[56] References Cited

U.S. PATENT DOCUMENTS

| | | | |
|---|---|---|---|
| 5,257,306 | 10/1993 | Watanabe | 348/15 |
| 5,347,306 | 9/1994 | Nitta | 348/15 |
| 5,485,211 | 1/1996 | Kuzma | 348/409 |
| 5,485,611 | 1/1996 | Astle | 395/600 |
| 5,506,624 | 4/1996 | Moreton | 348/420 |
| 5,506,954 | 4/1996 | Arshi et al. | 395/162 |
| 5,538,255 | 7/1996 | Barker | 463/41 |
| 5,572,248 | 11/1996 | Allen et al. | 348/15 |
| 5,615,287 | 3/1997 | Fu et al. | 382/232 |

OTHER PUBLICATIONS

Ohya et al., "Real-time Reproduction of 3D Human Images in Virtual Space Teleconferencing", ATR Communication Systems Research Laboratories, *International Symposium on Virtual Reality*, 1993, pp. 408–414.

Morishima et al., "Image synthesis and editing system for multi-media human interface with speaking head", *IEEE Conference on Image Processing and Its Applications*, 1992, pp. 270–273.

Poggio et al., "A Novel Approach to Graphics", MIT Artificial Intelligence Laboratory Memo No. 1354, MIT Center for Biological Information Processing Pater No. 71, Feb. 1992, pp. 1–17.

Lettieri, "Storing Multimedia Images in a PC", WESCON/94: Idea/Microelectronics, 1994, pp. 154–159.

*Primary Examiner*—Joseph H. Feild
*Assistant Examiner*—Stephen Hong
*Attorney, Agent, or Firm*—Foley & Lardner

[57] ABSTRACT

A method and apparatus for transferring original data which includes images, between two stations located a distance apart, without actual transmission of the image portion of the data. A library of images are provided at each of the stations. The image to be transferred is processed into a description of the image which allows the reproduction of the image at the receiving end of the transmission using the images contained in the image library in the receiving station.

14 Claims, 4 Drawing Sheets

SYSTEM FOR REPRODUCING IMAGES UTILIZING IMAGE LIBRARIES

BACKGROUND OF THE INVENTION

The instant invention is directed to a system and method for transferring data, including images such as video images, over a data link, and more particularly, to a system and method wherein the amount of data which is actually transferred over the data link connecting a transmitting and receiving station is greatly reduced.

Conventionally, real time transmission of images, such as video images, between two stations requires the transfer of extremely large amounts of data over the transmission line connecting the two stations. The large data transfer requirements are due to the data intensive nature of video images. Video images are data intensive because for each pixel of data several values of information about the pixel, such as hue, brightness, and color must be transferred along with location of the pixel.

Various schemes have been developed to reduce the amount of data necessary to transfer video images. One such scheme exploits the fact that transferring video data normally involves the transfer of a large amount of redundant information. Redundant information lies in successive frames of the video data, since the change between such frames is generally small. Some compression schemes which reduce the total amount of data to be sent exploit redundant information in successive frames of the image data. For example, in one such scheme only every other frame in the image is sent. The intermediate frames are reconstructed using the preceding frame and the succeeding frame and motion vectors prepared before the image data is transferred. However, even when using such compression techniques, large amounts of video data must still be transferred over the transmission lines.

SUMMARY OF THE INVENTION

An object according to the invention is to provide an image transmission system and method which overcomes the drawbacks of the above-described system by reducing the amount of data which needs to be transmitted over the transmission line.

The instant invention overcomes the above-described drawbacks by providing unique transmitting and receiving stations which preprocess the data prior to transmission and post-process the data after reception. These stations are constructed with processors and memories, such that the need for transferring video image data can be greatly reduced and in many instances practically or completely eliminated. To the extent possible, data representing elements of an image being input (e.g., from a video camera) for transmission to a receiving unit are stored as objects in memories of both the receiving and transmitting units. A processor in the unit receiving the input image identifies elements of the objects in the image and accesses a preprogrammed or built-up data base of objects formed from such elements. Recognizable combinations of elements of the image are used to identify the objects and correlate the objects in the image with those already stored. Unrecognized objects are stored as new objects formed by the particular combination of elements. When an object is stored, it is stored in memories in both the transmitting and receiving device. The objects are identified by codes which allow the transmitting and receiving units to retrieve from memory the same object by transmitting the code rather than by transmitting the entire image. This code transmission significantly reduces the amount of data which must be communicated between the transmitting and receiving units. Since images may change from frame to frame, attribute vectors are calculated which identify differences between signals representing the object retrieved from the memory of the transmitting device and the original image being input for transmission, for example from a video camera, to the receiving device. The attribute vectors are then transmitted to the receiving device which employs a processor to modify the object, so that the image displayed appears the same as or similar to the image being input.

Thus, according to the invention a system for reproducing an original image present at a first station at a second station includes a first image library at the first station storing a first image. A second image library at the second station stores a second image, which second image substantially corresponds to the first image. A comparison unit is used for comparing the original image with the first image and for producing image characteristic information. The image characteristic information includes information representing a difference between the first image and the original image. The system also includes means for transmitting this image characteristic information to the second station. An image modifying unit retrieves the second image from the second image library and modifies the second image based on the image characteristic information transmitted from the first station to produce a recreation of the original image.

A method according to the invention of transferring data including an original image between a first station and a second station includes receiving the data in the first station and extracting the original image from the data. A first stored image from an image memory in the first station corresponding to the original image and a stored image identifier associated with the first stored image are retrieved. The first stored image is compared with the original image and attribute vectors representing a difference between the first stored image and the original image are calculated. The stored image identifier of the first stored image is sent along with the attribute vectors to the second station. A second stored image, corresponding to the first stored image, is retrieved from an image memory in the second station using the stored image identifier. The second stored image is modified based on the attribute vectors to produce a modified image corresponding substantially to the original image.

BRIEF DESCRIPTION OF THE DRAWINGS

The invention will be better understood by reference to the detailed description set forth below and the attached drawings in which.

DETAILED DESCRIPTION OF THE PREFERRED EMBODIMENTS

Figure 1:
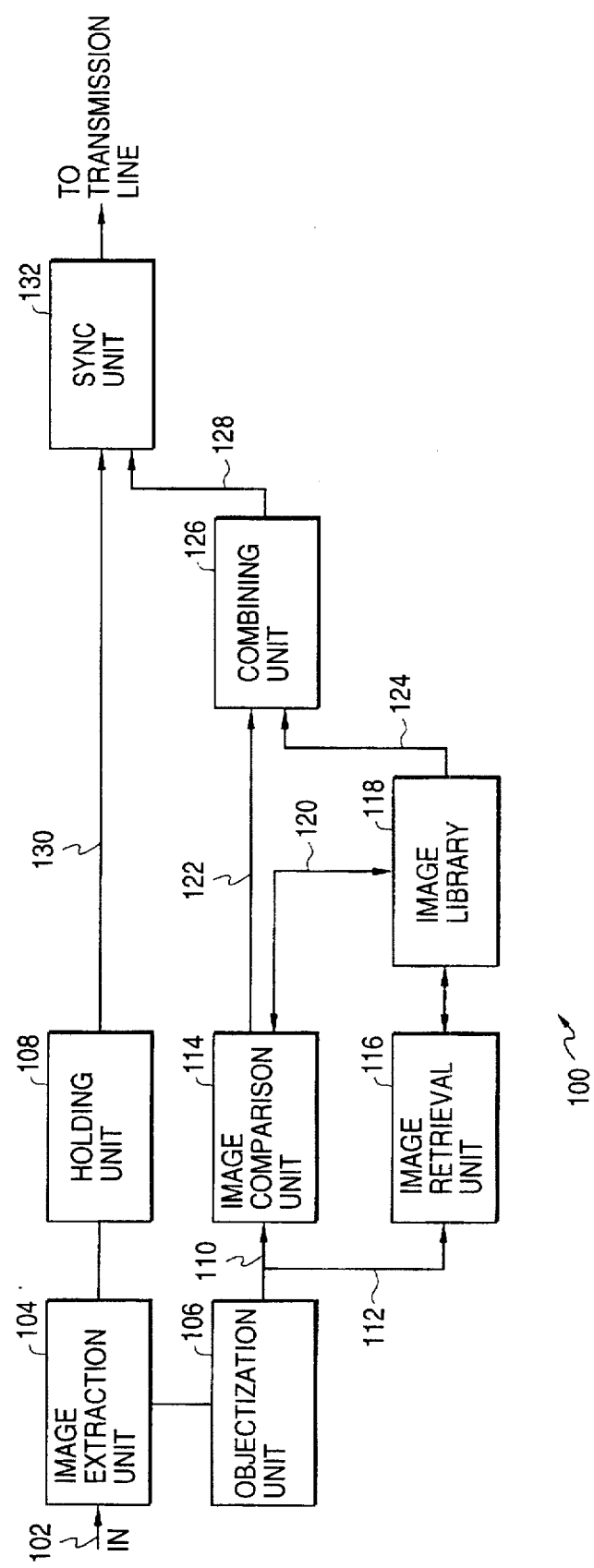
FIG. 1 represents a transmission portion of a station according to the instant invention.
Figure 2:
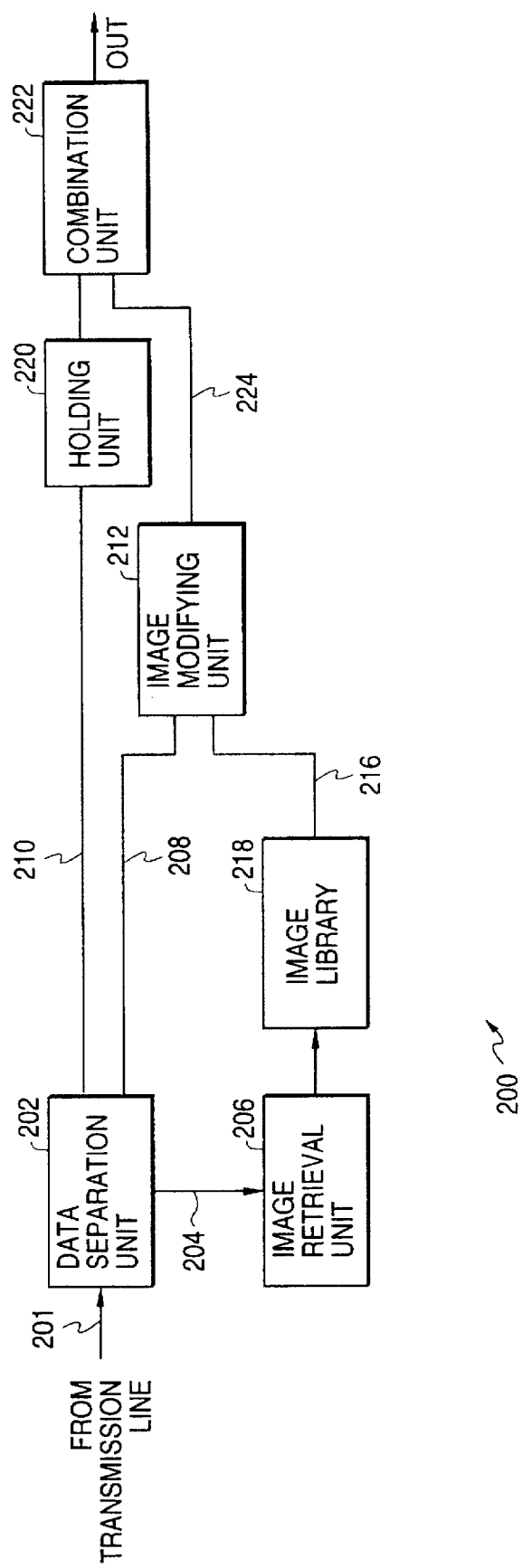
FIG. 2 represents a receiving portion of a station according to the instant invention.

FIGS. 1 and 2 illustrate, respectively, transmitting and receiving portions of a processing station according to the invention. One or more such processing stations can be incorporated into a system according to the invention. The stations are connected to a transmission line for transferring data therebetween. The portions of the stations depicted in FIGS. 1 and 2 are normally provided in each station, such that each station has the capability of both transmitting and receiving image information. Thus, a single processing station would exist on both the receive and transmit end, and the circuitry shown in FIGS. 1 and 2 would be found together in each single processing station.

For purposes of clarity, the method and apparatus according to the invention will be described in terms of transmitting data from a first station 100 to a second station 200. The transmitting portion of station 100 is illustrated in FIG. 1 while the receiving portion of station 200 is illustrated in FIG. 2. However, as noted herein, those of ordinary skill will understand that incorporating the circuitry of FIG. 1 and FIG. 2 into the first processing station 100 on the transmit end and into the second processing station 200 on the receive end will allow bidirectional operation according to the invention.

As illustrated in FIG. 1, data is provided to the transmission station 100 along line 102. The data includes images which are to be reproduced at the receiving station 200. The data, including the images, are provided to an image extraction unit 104 which extracts the images from the data, separating the image portion of the data from other types of data which is to be transmitted to the receiving station 200. The other types of data include, for example, audio information, instructions for using the information, etc. The extracted images are provided to an objectization unit 106 which divides a received image into individual objects contained within the image as more fully described below. In order to perform this function, the objectization unit 106 may include a processor which searches an image for predetermined or known elements, which characterize the image. For example, elements expected to appear in an image can be stored in a memory or data base accessed by the processor over a separate bus. The elements can be compared by the processor to elements in the image received by the input unit. Sets of elements can identify a particular object. Any suitable objectization processing may be employed according to the invention in order to identify an object.

The remainder of the data (i.e., data other than the image) is supplied from the image extraction unit 104 to a holding unit 108. The holding unit 108 may comprise, for example, a first in first out memory buffer or other type of memory.

After the image has been objectized, the objects are then individually provided along signal lines 110 and 112 to a stored image comparison unit 114 and a stored image retrieval unit 116, respectively. The stored image retrieval unit 116 retrieves stored images from a stored image library 118. The stored image library 118 is a memory capable of storing a large number of images. The images in the image library 118 will be referred to as library members. The stored image retrieval unit 116 searches the stored image library 118 to identify and retrieve a library member which matches the object extracted from the image by the objectization unit 106. Thus, the library member retrieved from the stored image library 118 corresponds to the objectized image extracted from the image information.

Searching of the stored image library may be accomplished in any suitable manner. For example, a processor may search a first set of elements of an image against elements of stored library members to eliminate a potentially large number of candidates, as discussed further hereinafter. Subsequent searches of more detailed elements further reduce candidates to sets with fewer and fewer members, until a single candidate can be identified for retrieval.

The retrieved library member is provided to the image comparison unit 114 along signal line 120. The image comparison unit 114 carries out a differential comparison between the object from the objectization unit 106 and the library member, (i.e., stored image) retrieved from the stored image library 116. While the library member retrieved from the stored image library 118 corresponds to the object taken from the original image, it often will not necessarily be identical. Rather, the library member need only have a sufficient similarity to the object to be identified by the stored image retrieval unit 116 as corresponding to the object. If no image (library member) in the stored image library 118 has a sufficient similarity to the object provided to the stored image retrieval unit 116, for example, as determined by arbitrary measures of similarity, the object will be stored into the stored image library 118 as a new member of the library. This image will also be transferred to the stored image library 218 of the receiving station 200 to update its membership as will be more fully described below.

The image comparison unit 114 calculates a plurality of attribute vectors as a result of the differential comparisons. The attribute vectors represent the difference between the object provided to the image comparison unit 114 from the objectization unit 106 and the library member retrieved from the stored image library 118. The attribute vector is output along line 122 and represents quantifiable differences between the two images. Each of the library members in the stored image library 118 has associated therewith an image identifier which uniquely identifies the library member. For example, an address of the stored image library holding the library member may be used as an image identifier for that stored image.

A combining unit 126 receives the attribute vectors along signal line 122 and the image identifier along signal line 124. Combining unit 126 combines the two inputs and outputs a signal along signal line 128 which correlates the particular image identifier with the appropriate set of attribute vectors. The output of combining unit 126 is provided to the synchronization unit 132. In the synchronization unit 132 the data from holding unit 108 is combined and synchronized with the attribute vectors and image identifier corresponding to the additional data. The output signal provided to the transmission line from synchronization unit 132 does not include actual images. Instead, all that is transmitted are the image identifier, a set of attribute vectors and other non-image data, except when it is necessary to transmit new library members, as discussed further hereinafter. According to the invention, the elimination of the need to transfer actual image data significantly reduces data communication requirements. The transmission line is connected to a receiving station 200.

In the receiving station 200, illustrated in FIG. 2, data is transferred from the station 100 through the transmission line to signal line 201. A data separation unit 202 receives the data provided and divides the data into its constituents, i.e., the image identifier, the attribute vectors, and the remaining data. The image identifier is provided along signal line 204 to a stored image retrieval unit 206. The attribute vectors are provided along signal line 208 to an image modifying unit 212. The remaining data is provided along signal line 210 to a holding unit 220, similar to the holding unit 108 in FIG. 1.

The stored image retrieval unit 206 retrieves a library member from the image library 218 which corresponds to the image identifier. The library member in stored image unit 218, identified by the image identifier, corresponds to the library member in the stored image library 118, also indicated by the identifier. In other words, a particular image identifier identifies an image within each of the stored image libraries 118, 218 which is identical, or at least substantially the same.

If it was determined in the transmission stage that the stored image library 118 did not store an image corresponding to an object, the object image was stored in the stored image library 118 as a new library member. This object image, along with an identifier indicating where the image is stored in the stored image library 118 would also be transmitted to the receiving station 200. In the receiving station 200, this new library member is provided to the image library 218 as a new library member identified by the image identifier.

The stored image retrieval unit 206 retrieves the identified library member from the stored image library 218 and provides the library member to the image modifying unit 212 along line 216. The image modifying unit 212 also receives the attribute vectors along line 208 from the data separation unit 202. The image modifying unit modifies the retrieved library member by carrying out an inverse transform on the basis of the attribute vectors as more fully described below. The modified image is provided along line 224 to a combination unit 222. The combination unit combines data received from the holding unit 220 with the modified library member image to produce an output data signal of the thusly reconstructed image.

In the above-described apparatus, the output from the combination unit 222 includes an image substantially the same as the image contained in the original data supplied to the transmission station 100. In the above-described operation according to the invention, the reconstruction of the image information at the receiving station 200 allows efficient effective transmission of image intensive data (e.g., video data) along a transmission line without the actual transmission of image data. In many instances, once a complete stored image library is generated in each station, no transmission of images is required.

Each of the elements of the system according to the invention, such as the image comparison unit 114, combining units 126 and 222, data separation unit 202, image retrieval unit 206, image modifying unit 212, holding units 108 and 220, objectization unit 106, extraction unit 104, image libraries 118 and 218 and other units can be assembled with conventional interconnections of processors, memories, and other circuitry to perform the functions required therein in hardware and software.

Figure 3A:
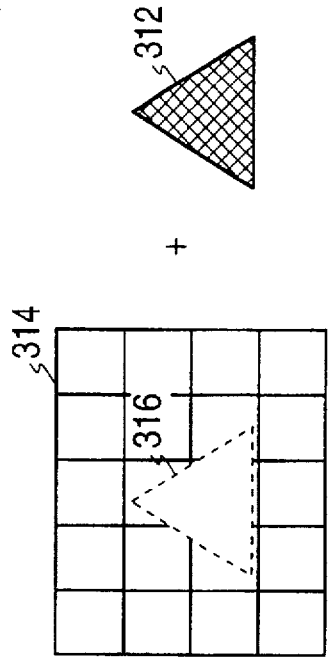
FIGS. 3A–3D illustrate an operation of the device depicted in FIGS. 1 and 2.

FIGS. 3A–3D provide a simplified illustration of the operation of a system according to the invention. FIG. 3A illustrates an image which is contained in the data applied to the transmission station 100. The image 310 comprises a blue triangular shaped object 312 which has a background image 314 behind it. At this point, the image 310 has been extracted from other data in the signal to be transmitted.

Figure 3C:
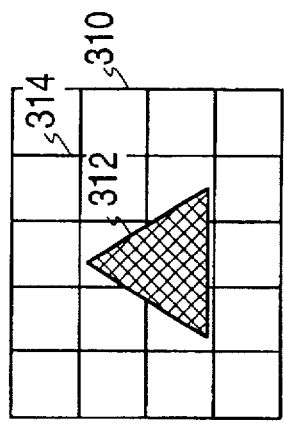
Figure 3B:
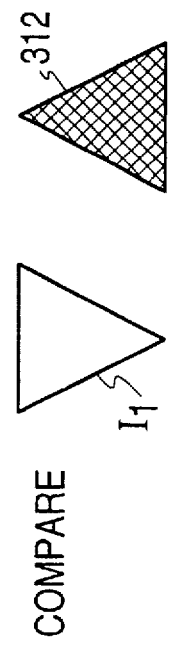

The objectization unit 106 (FIG. 1) separates the image 310 into its two components (i.e., objects 312, 314) as illustrated in FIG. 3B. That is, the image is divided into a background image 314 which has a triangular shaped void 316 (one object) and a triangular shaped image 312 (an additional object). As described above, the stored image libraries 118 and 218 store a plurality of library members. As illustrated in FIG. 3C, a first library member $I_1$, ($I_1$ being the library member image identifier) represents a white triangle. A second library memory $I_2$, for example, represents an image background.

Figure 3D:
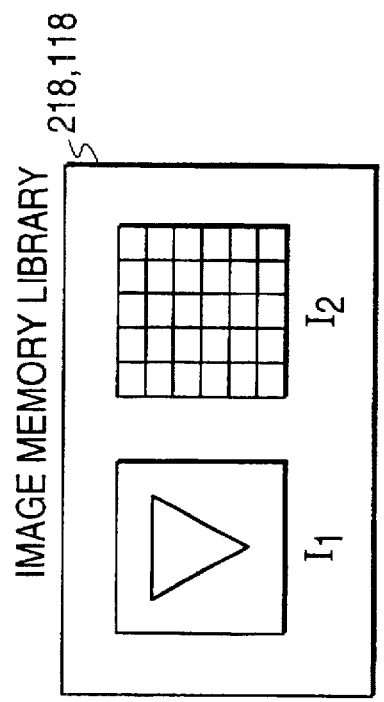

The overall operation of the system will be described with respect to the triangular shaped object 312. However, the same steps could be carried out for each object in the input signal. The stored image retrieval unit 116 searches the image memory library 118 and identifies library member $I_1$, as corresponding generally to the triangular shaped object 312. In this case the similarity of shape indicates a match. Accordingly, the library member $I_1$ is provided to the comparison unit 114. As illustrated in FIG. 3D, the library member $I_1$ is compared to the object 312. Attribute vectors are calculated on the basis of the comparison.

The calculation of attribute vectors will now be described. In order to make the object 312 look like the library member $I_1$, the object 312 must be rotated by a 180° counter-clockwise (−180°). The color of the object 312 must also be changed from blue to white for the object to appear substantially identical to the library member $I_1$. It is noted that other operations could be considered. For example, it may be required that the image be enlarged or reduced in size, rotated along other axes, etc. The differences between the two images is thus represented in terms of the attribute vectors. In this example, the attribute vectors attached to library member $I_1$ can be expressed as follows:

$$\text{Image Characteristic} = I_1(-R_{180}, -B_{75}).$$

where $-R_{180}$ represents a rotation vector of 180° in a negative (counter-clockwise) direction and $-B_{75}$ represents a subtraction of the color of blue by 75%. The 75% corresponds to the brightness value for blue in the object image 312. In other words, the image 312 can be converted into the library member $I_1$, by rotating it 180° counter-clockwise and by changing the amount of blue in the image by 75%. The attribute vectors $(-R_{180}, -B_{75})$ are associated with the image identifier $I_1$, of the library member. This equation represents the image characteristics of the combined output from the combining unit 126 (FIG. 1).

The image characteristics (i.e., $I_1(-R_{180}, -B_{75})$) are combined with any remaining data and transferred to the receiving station 200. In the receiving station 200, an image $I_1'$ is retrieved from the image storage library 218 which corresponds to (i.e., is identified by) the image identifier $I_1$. An inverse transform, according to the above equation is then carried out on the image $I_1'$ retrieved from the stored library 218. In other words, the image $I_1'$ is rotated in a positive direction by 180° and the color is also changed by adding blue at 75% intensity. In this manner, the receiving station 200 reproduces the image 312 on the basis of the stored image $I_1'$ in the stored image library 218 and the attribute vectors attached to the image identifier $I_1$. As illustrated above, an actual image of the object 312 is not transmitted along the transmission line. Rather, the image is reconstructed using the library image and the attribute vectors.

Figure 4:
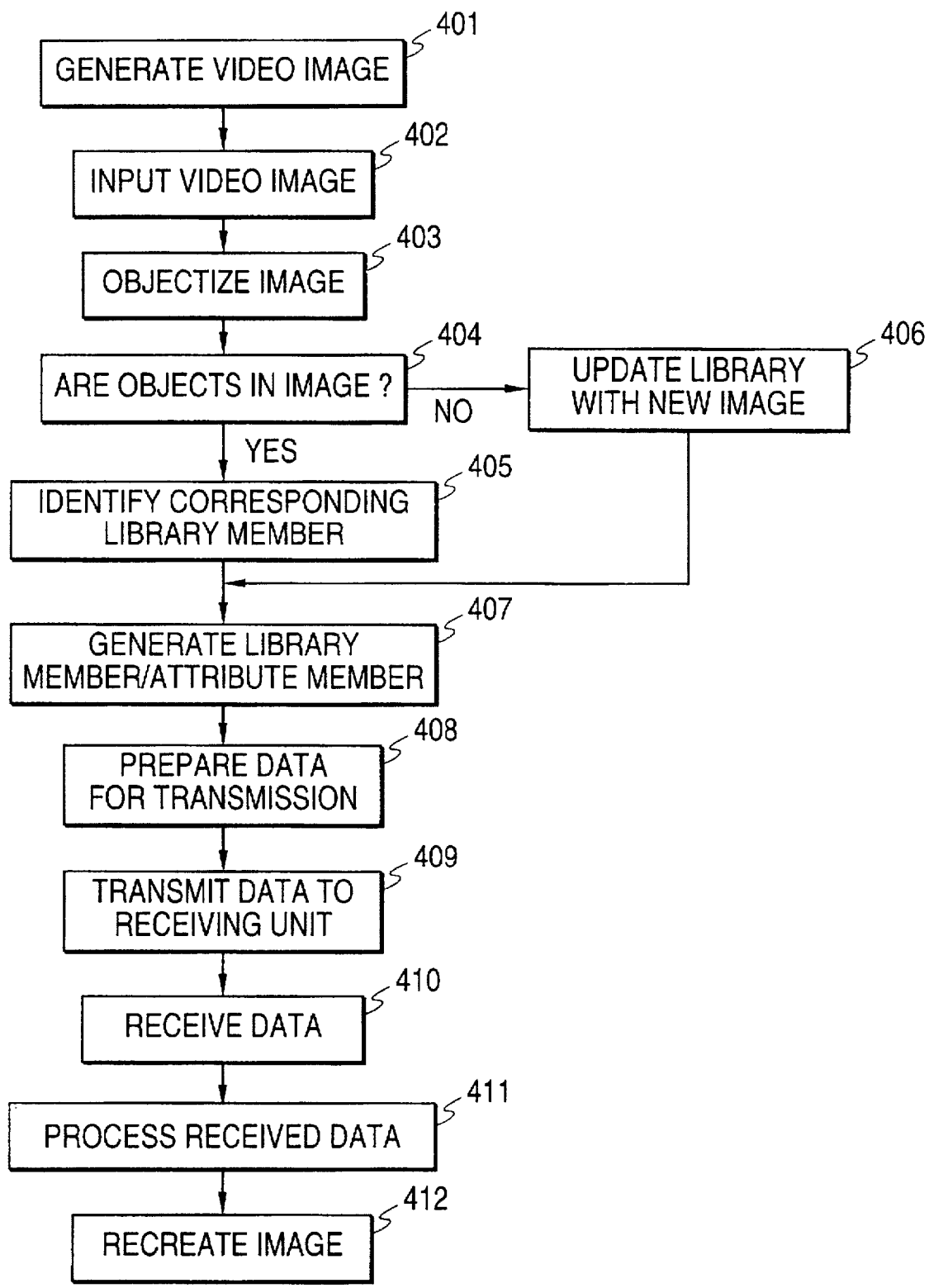
FIG. 4 is a flow chart of operation according to the instant invention.

FIG. 4 is a flow chart of a method according to the instant invention. Many of the steps illustrated in FIG. 4 can be implemented in software and carried out using a programmed general purpose computer or special purpose computer. The computer will include at least a central processing unit (CPU) and computer memories such as RAM and ROM, interconnecting data and control busses and interface units to interface the other elements of the system.

At step 401, a source of data including an image, for example, a video image, is generated. In one preferred embodiment, two video cameras are used to produce a stereoscopic image. The three-dimensional nature of the stereoscopic image enhances the ability of the system to discriminate objects by providing depth information in the image. At step 402, the video image is provided to the processing unit of the system. The received video image is examined and objects are extracted at step 403. At step 404, the system checks to determine whether or not the objects extracted are contained in the stored image library of the system. If the answer to this question is yes, the system proceeds to step 405. Alternatively, if the answer to the question is no, then it proceeds to step 406. At step 406, a new library image is generated and key attributes to be used for attribute vectors are identified. The new library image is stored in the image library with key attribute identifiers (for example, size, color, motion, location, etc.) Additionally, the new library member may be transmitted to the receiving station to be stored in the receiving station library.

Returning to step 404, it is determined whether an object is in the library by asking whether a library member is known to correspond to the object. For example, it may be known that the particular object is the same as an object previously identified. If the corresponding library member is not already known, a comparison is made by library members and comparing the object with the retrieved members. As previously noted, any suitable comparison technique can be employed by the processor. For example, an iterative technique successively eliminating classes of objects could be used. In the case of the triangle discussed herein with respect to FIGS. 3A–3D, objects with two or more parallel lines could be eliminated as a class of candidates to be searched, before continuing to search the library members based on other criteria.

The processing unit calculates one or more measures of similarity between the object and each candidate library member. The processing unit selects the library member having the highest degree of similarity to the object. If the degree of similarity between the object and the selected library member is within a prescribed threshold, it is determined that the object is in the image library. The selected member is identified as corresponding to the object at step 405.

At step 407, a library member/attribute vector profile is generated for the identified library member. This is carried out by comparing the object with the identified library member and generating attribute vectors for the object. As described above, the attribute vectors represent the manner in which the object must be modified in order to produce the library member. It is noted, however, that the inverse of this process could be carried out. In some applications, the library member may need to be updated periodically in order to improve the overall performance of the system. This will be carried out at step 407 when the degree of similarity is small but the correspondence of the library member to the object is considered to be reliable.

At step 408, the data is prepared for transmission. The transmission is set up by combining the library member (image) identifier with attribute vectors calculated in step 407. Also, the timing of transmissions are synchronized. A transmission quality/bandwidth is set and the data is encoded for transmission. The data should also be encapsulated as known in the art. At step 409, the data including the library image identifier and the attribute vectors are sent along a transmission line to a receiving unit. The instant invention can be used with any type of data transmission system (e.g., wireless, optical, etc.).

At step 410, the data is received from the transmission station. In the receiving unit, at step 411, the data is again processed. The receiving unit also includes all of the processing hardware and software to carry out the described functions. The data is decapsulated and a bandwidth analysis is carried out. Library maintenance may also be carried out at this time. If, for example, the received transmission contains images to be added to the library as new library members, the library is updated at this time with the new images.

At step 412, a modified (or recreated) image is produced to represent the original image as closely as possible. This is carried out by retrieving the stored image library member identified by the image identifier contained in the transmission data from the library on the reception side. The retrieved library member is modified in accordance with the attribute vectors. A complete output image is produced using the modified library member image and the remaining original data.

Images are generally transmitted at a predetermined frame rate, e.g., 30 frames per second. Often differences from frame to frame are minimal. For example, a rotating triangle, such as the triangle discussed herein with respect to FIGS. 3A–3D, in successive frames may vary only slightly in position from frame to frame. According to the invention, for each frame it is only necessary to transmit the image identifier and an attribute vector relating to the rotation in position of the object in each frame. This arrangement eliminates the need to retransmit redundant information about the objects in the image during each frame while still providing an accurate display.

Further, according to the invention, it is possible to define an object as a dynamic or moving object to be stored as a library element. For example, where the motion of the triangle discussed above is known a priori, (e.g., the triangle rotates through 360 degrees every 120 frames) the motion information could be incorporated into the definition of the object and stored in the element library. This further reduces the information which need be transmitted as an attribute vector. Thus, processing can be performed so that objects are defined and stored as library elements according to predictable characteristics of the objects in the images which are input. Further, according to the invention, standard objects with fixed characteristics can be incorporated into the libraries as library elements.

Real time transmission of image data may be used to enhance the output image as it is available. The use of real time image data enhances the flexibility of the system by producing a hybrid system. The hybrid system balances the low transmission requirements of a system where no images are transmitted between stations and the high resolution of a system where substantial amounts of images are transferred to more precisely reproduce the video image. The system will balance the advantages of the two schemes as needed. Further, a hybrid system enhances image quality in situations where abrupt image changes occur.

It will also be understood that a system according to the invention can employ information compression techniques, such as transmitting information only on every other frame and reconstructing the intervening frame. This approach can also be in implemented in a hybrid system according to the invention, as discussed above.

It should be understood that the above-described system could be simultaneously operating on a number of transmission/reception units. In this manner, real time video conferencing could be held between several different locations using only a minimal amount of transmission lines. Furthermore, as the process continues, the stored library images are increased such that the need for transferring video images can be substantially reduced or eliminated. In certain applications, where a number of standard images will be repeatedly used, large libraries of stored images can be created and transferred using portable storage media, such as removable disks. In this manner, no actual video images need be transmitted between the transmission and reception station. Thus, a large video image library can be generated and physically sent to a remote location. Then, data including video image information (i.e., image identifiers and attribute vectors) can be transferred between the two stations in real time over a transmission line having an insufficient capacity to transmit the actual video images.

The above description should not be considered limiting. Many modifications and uses of the features described in the instant invention will become apparent to one of ordinary skill in the art without departing from the scope of the instant invention. Thus, the invention is only limited by the appended claims attached hereto.

What is claimed is:

1. A method of transferring data including an original image between a first station and a second station, the method comprising the steps of:

receiving the data in the first station;

extracting the original image from the data at the first station;

retrieving a first stored image and a second stored image from a first image library in the first station and a stored first image identifier associated with the first stored image and a stored second image identifier associated with the second stored image;

comparing the first stored image with the original image, and comparing the second stored image with the original image, at the first station;

determining which of the first and second stored images most closely resembles the original image;

calculating attribute vectors representing a difference between the most closely resembled one of the first and second stored images and the original image, at the first station;

sending the stored image identifier of the most closely resembled one of the first and second stored images along with the attribute vectors to the second station;

retrieving one of a third stored image and a fourth stored image, the third stored image corresponding to the first stored image and the fourth stored image corresponding to the second stored image, from a second image library in the second station using the stored image identifier; and modifying the retrieved stored image based on the attribute vectors to produce a modified image corresponding substantially to the original image, at the second station.

2. A system according to claim 1, wherein the original image is separated into a plurality of objects irrespective of locations of the objects in the original image.

3. A system according to claim 2, wherein each object is compared with both the first and the second images so as to determine which of the first and second images most closely resembles each object, wherein corresponding attribute vectors and associated image identifiers are produced for the most closely resembled one of the first and second images, and wherein the corresponding attribute vectors and associated image identifier of the most closely resembled one of the first and second images are transmitted to the second station for the producing of the modified image at the second station.

4. A system according to claim 3, wherein the attribute vectors of the most closely resembled one of the first and second images correspond to vectors having values representing at least: i) an angular relationship between the original image and the most closely resembled one of the first and second images, and ii) a size relationship between the original image and the most closely resembled one of the first and second images.

5. A system according to claim 2, wherein the stored image identifier of the most closely resembled one of the first and second images is used at the second station as a memory address pointer to retrieve the corresponding one of the third and fourth images from the second image library.

6. A system according to claim 1, wherein the first image library further includes a fifth image and the second image library further includes a sixth image corresponding to the fifth image, wherein the extracting step extracts geometrical characteristics of the original image, wherein, prior to the step of retrieving of the first and second images from the first image library, a preprocessing step is performed to compare the geometrical characteristics of the original image with stored geometrical characteristics of each of the first, second and third images in order to retrieve only certain ones of the first, second and third images which have corresponding stored geometrical characteristics which closely resemble the geometrical characteristics of the original image, and wherein only the retrieved certain ones of the first, second and third images are compared with the original image in the comparing step.

7. A system according to claim 1, wherein the first and second images correspond to object data that are stored in the first image library at the first station prior to receiving any image data to be transferred to the second station.

8. A system for reproducing an original image present at a first station at a second station, comprising:

a first image library at the first station storing at least a first image and a second image, the first image having a first identifier and second image having a second identifier;

a second image library at the second station storing at least a third image and a fourth image, the third image substantially corresponding to the first image, the fourth image substantially corresponding to the second image;

a comparison unit at the first station for comparing the original image with the first image and the second image, for determining which of the first and second images most closely resembles the original image, and for producing attribute data including information representing a difference between the original image and the most closely resembled one of the first and second images;

a transmitting unit for transmitting the associated identifier and the attribute data of the most closely resembled one of the first and second images to the second station; and an image modifying unit at the second station, wherein the image modifying unit retrieves the corresponding one of the third and fourth images from the second image library based on the associated identifier and modifies the retrieved image based on the image characteristic information transmitted from the first station to produce a recreation of the original image.

9. A system according to claim 8, wherein the original image is separated into a plurality of objects irrespective of locations of the objects in the original image.

10. A system according to claim 9, wherein each object is compared with both the first and the second images so as to determine which of the first and second images most closely resembles each object, wherein corresponding attribute data and associated identifier are produced for the most closely resembled one of the first and second images, and wherein the corresponding attribute data and associated identifier of the most closely resembled one of the first and second images are transmitted to the second station for the recreation of the original image at the second station.

11. A system according to claim 10, wherein the attribute data of the most closely resembled one of the first and second images corresponds to at least one of: i) angular relationship between the original image and the most closely resembled one of the first and second images, and ii) size relationship between and the original image and the most closely resembled one of the first and second images.

12. A system according to claim 9, wherein the associated identifier of the most closely resembled one of the first and second images is used at the second station as a memory address pointer to retrieve the corresponding one of the third and fourth images from the second image library.

13. A system according to claim 8, wherein the first image library further includes a fifth image and the second image library further includes a sixth image corresponding to the fifth image, the system further comprising:

an extraction unit at the first station for extracting geometrical characteristics of the original image; and a preprocessor for comparing the geometrical characteristics of the original image with stored geometrical characteristics of each of the first, second and third images in order to retrieve only certain ones of the first, second and third images which have corresponding stored geometrical characteristics which closely resemble the geometrical characteristics of the original image, wherein only the retrieved certain ones of the first, second and third images are compared with the original image by the comparison unit.

14. A system according to claim 8, wherein the first and second images correspond to object data that are stored in the first image library at the first station prior to receiving any the data to be transferred to the second station.

* * * * *